United States Patent
Liu et al.

(10) Patent No.: US 9,472,968 B1
(45) Date of Patent: *Oct. 18, 2016

(54) METHOD OF CONTROLLING BATTERY STATE USING CONSTANT-VOLTAGE DISCHARGE

(71) Applicant: Atieva, Inc., Menlo Park, CA (US)

(72) Inventors: Albert Liu, Menlo Park, CA (US); Samuel Yeong-Shi Chang, Menlo Park, CA (US); Wilson Liu, Menlo Park, CA (US); Steve Diamond, Menlo Park, CA (US)

(73) Assignee: Atieva, Inc., Menlo Park, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/860,575

(22) Filed: Sep. 21, 2015

Related U.S. Application Data

(63) Continuation of application No. 13/714,214, filed on Dec. 13, 2012, now Pat. No. 9,142,977.

(51) Int. Cl.
*H01M 10/44* (2006.01)
*H01M 10/46* (2006.01)
*H02J 7/00* (2006.01)

(52) U.S. Cl.
CPC ...... *H02J 7/0063* (2013.01); *H02J 2007/0067* (2013.01)

(58) Field of Classification Search
CPC ............... H02J 7/0031; H02J 7/0078; H02J 2007/004; H02J 2007/0067
USPC ........ 320/127, 131, 132, 135, 152, 157, 162
See application file for complete search history.

(56) References Cited

U.S. PATENT DOCUMENTS

| | | | |
|---|---|---|---|
| 7,615,967 B2 * | 11/2009 | Cho | G01R 31/3679 320/132 |
| 9,142,977 B1 * | 9/2015 | Chang | H02J 7/00 320/131 |
| 2005/0110466 A1 * | 5/2005 | Shoji | G01R 31/3624 320/150 |
| 2007/0090805 A1 * | 4/2007 | Mizuno | G01R 31/361 320/132 |
| 2012/0306450 A1 * | 12/2012 | Nakayama | G06F 1/263 320/134 |

* cited by examiner

*Primary Examiner* — Edward Tso
(74) *Attorney, Agent, or Firm* — Womble Carlyle Sandridge & Rice LLP

(57) ABSTRACT

A battery is rendered to a consistent discharged state in a two-phase battery discharge operation. In a first of the two discharge phases, a constant discharge current is drawn from the battery until a threshold battery voltage is reached. In the second of the two discharge phases, executed after the threshold battery voltage is reached during the first-phase, a time-varying discharge current is drawn from the battery at a constant battery voltage until a threshold discharge current is reached.

16 Claims, 4 Drawing Sheets

Battery Capacity Determination System

Battery Capacity Determination System

Adjustable Load

Adjustable Load – Alternative Embodiment

Fully Discharge Battery

Determine Battery Capacity

METHOD OF CONTROLLING BATTERY STATE USING CONSTANT-VOLTAGE DISCHARGE

FIELD OF THE INVENTION

The present invention relates to rechargeable battery systems.

BACKGROUND

The fully-discharged or "empty" state of a rechargeable battery constitutes a reference point for determining a number of critical characteristics, including the full capacity of the battery as well as the charge remaining (i.e., state of charge (SOC)) following a period of use or dormancy. The SOC itself is typically applied to determine other important battery characteristics, including the DC resistance (DCR), a measure of wear that may be applied, in turn, to quantify the state-of-health of the battery.

Unfortunately, the conventional approach to establishing a fully discharged battery—discharging a fully-charged battery at a constant current for a predetermined time—tends to yield inconsistent results depending, for example on the discharge current rate and battery temperature, as illustrated conceptually in FIGS. 1A and 1B.

BRIEF DESCRIPTION OF THE DRAWINGS

The present invention is illustrated by way of example, and not limitation, in the figures of the accompanying drawings and in which like reference numerals refer to similar elements and in which.

DETAILED DESCRIPTION

In various embodiments disclosed herein a battery pack is fully discharged to a consistent state by utilizing a two phase discharge process. During the first phase the battery is discharged at a constant current with the battery voltage decreasing until the battery voltage reaches a predetermined threshold. Next, during the second phase, the battery is discharged at a constant voltage with the battery current decreasing until the battery current reaches a predetermined threshold indicating a fully discharged battery. Through this two phase process, variations in the amount of charge actually remaining in the battery (i.e. the fully discharged state of the battery) may be reduced, particularly when the process is conducted under varying operating conditions such as different discharge currents and battery temperatures. This more consistent discharge state allows, in turn, for more accurate determination of battery capacity, state of charge, DC resistance (DCR), state of health and so forth. Additionally, compared to conventional single-phase techniques (using only a constant current discharge phase), the battery discharge process may occur more quickly and without the battery achieving voltage limits that may compromise battery life, safety, and other factors.

Figure 1A:
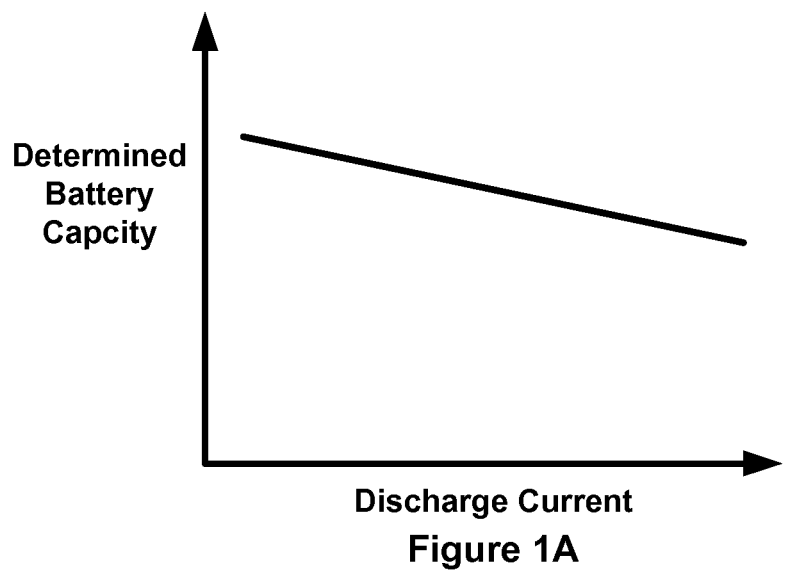
FIG. 1A is an exemplary diagram showing the relationship between the battery discharge current and the determined battery capacity when conventional techniques are used to discharge the battery.
Figure 1B:
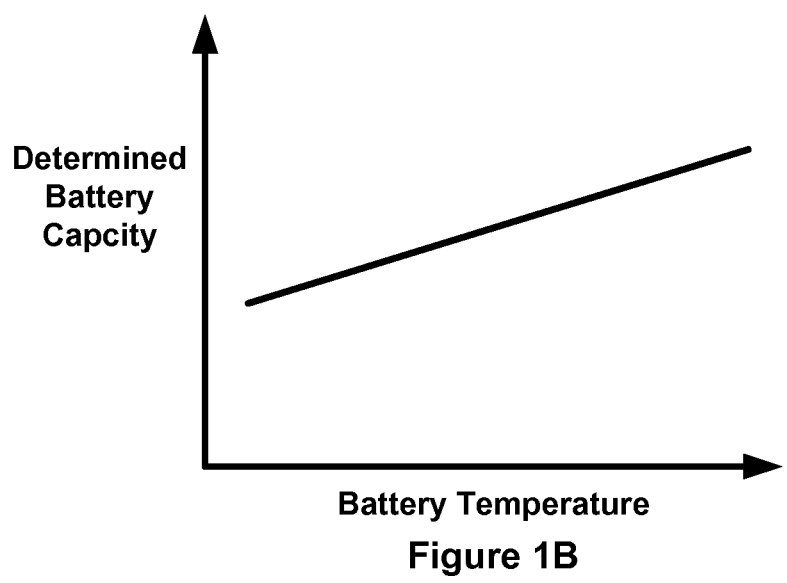
FIG. 1B is an exemplary diagram showing the relationship between the battery temperature and the determined battery capacity when conventional techniques are used to discharge the battery.
Figure 2A:
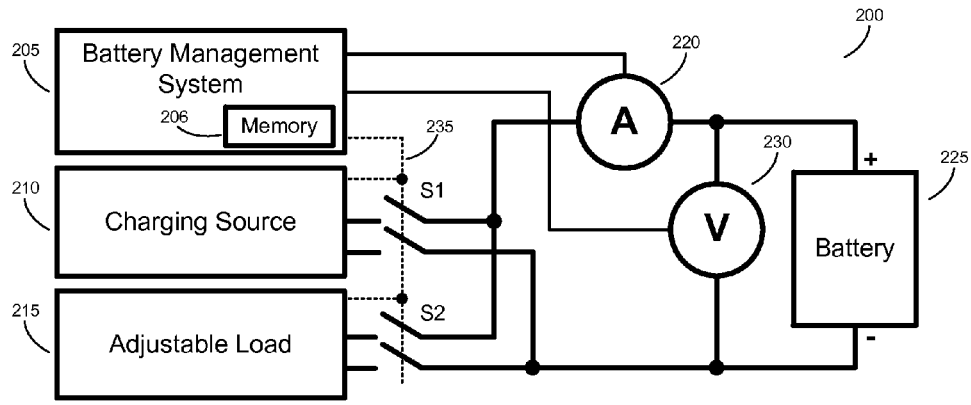
FIG. 2A illustrates one embodiment of circuitry capable of determining the capacity of a battery.

FIG. 2A illustrates an embodiment of battery capacity determination system 200. As shown, battery capacity determination system 200 comprises a battery management system 205, a charging source 210, an adjustable load 215 (shown in FIGS. 2B and 2C and described in more detail below), a current measuring device 220, a voltage measuring device 230, a battery 225 (for which the capacity is being determined) and two switches, S1 and S2, which are used to electrically couple the charging source and the adjustable load respectively to the battery. S1 and S2 are controlled (i.e. opened and closed) under the control of the battery management system via control network 235, which may also be used to control the charging source and the adjustable load. The battery management system, which may be used to execute the sequence of operations shown in FIGS. 3A and 4A, includes a memory 206 (to store information generated from the charging/discharging process and software code and data associated with executing the sequence of operations in FIGS. 3A and 4A) and may be implemented at least in part by a programmed processor. Other embodiments, which may comprise multiple batteries, may utilize more than one current and/or more than one voltage measuring device to monitor the charging/discharging process.

Figure 2B:
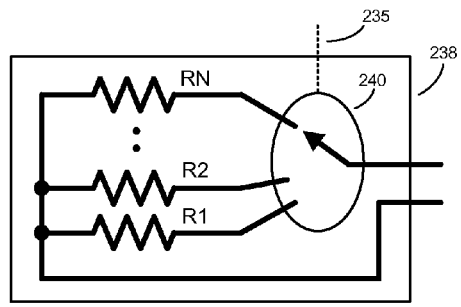
FIG. 2B illustrates one embodiment of circuitry capable of providing an adjustable battery load.

FIG. 2B illustrates an embodiment of an adjustable load circuit 238 that may be used to implement adjustable load 215. In the implementation shown, one of a plurality of resistors with different impedances (R1 though RN) is electrically coupled to the battery through switch 240 operated via the control network 235 to provide N different possible loads to the battery. When utilizing the embodiment of the adjustable load shown in FIG. 2B, the battery management system monitors the current flowing to/from the battery using the current measuring device 220 and the voltage across the battery using the voltage measure device 230. Both the battery current and voltage can be controlled as required by the battery management system via the control network. For example, if a larger battery current is required, a resistor with lower impedance can be selected within adjustable load circuit 238 by sending the appropriate control signal or command through the control network to switch 240. Similarly, if a higher battery voltage is required, a resistor with higher impedance can be selected using the switch 240. Another embodiment of the adjustable load comprises a variable resistor (e.g., a rheostat) in place of the plurality of resistors.

Figure 2C:
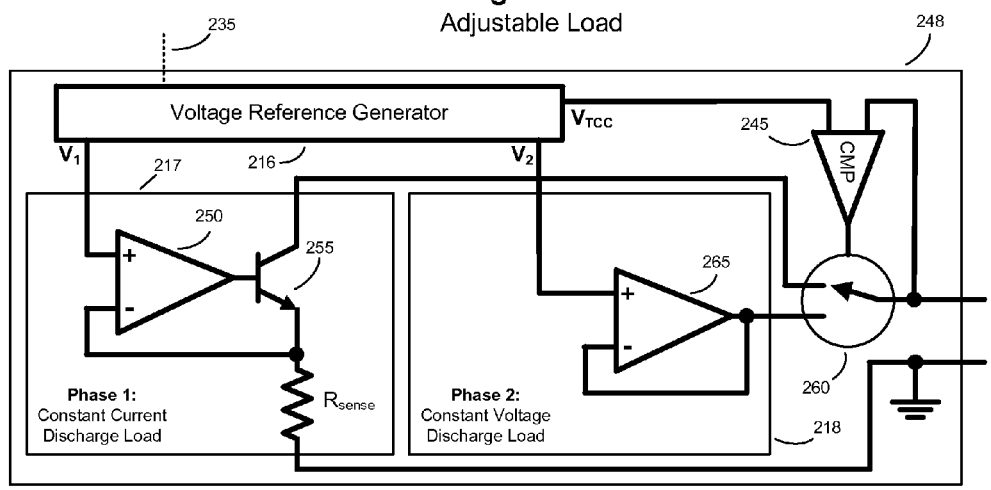
FIG. 2C illustrates an alternative embodiment of circuitry capable of providing an adjustable battery load.

FIG. 2C illustrates an alternative adjustable load circuit 248 that may be used to implement adjustable load 215 of FIG. 2A. As shown, adjustable load circuit 248 includes a voltage reference generator 216 to control the voltages and currents during discharging, circuitry 217 for generating a constant current load during phase 1 of the discharge, circuitry 218 for generating a constant voltage load during phase 2 of the discharge, a switch 260 to select between the phase 1 circuitry 217 and phase 2 circuitry 218, and a comparator 245, which generates the signals necessary to cause switch 260 to electrically couple the phase 1 circuitry when the battery voltage is above $V_{TCC}$ and to electrically couple the phase 2 circuitry when the battery voltage is equal to or below $V_{TCC}$.

The phase 1 circuitry 217 shown in FIG. 2C comprises an operational amplifier 250, variable-load transistor 255, and a current sensing resistor, $R_{SENSE}$. If the phase 1 circuitry 217 is coupled to the battery via switch 260, the discharge current flowing from the battery and through $R_{SENSE}$ will create a voltage across $R_{SENSE}$ that is compared, by the operational amplifier, to the voltage $V_1$. The voltage $V_1$ is generated by the voltage reference generator 216 based on control inputs from the battery management system via the control network 235. If the voltage across $R_{SENSE}$ is lower than $V_1$, then the operational amplifier will increase the control voltage at the base of transistor 255, driving transistor 255 toward a higher conductance (lower impedance) state, causing more current to flow from the battery and through $R_{SENSE}$ until the voltage across $R_{SENSE}$ increases to become similar to $V_1$. Likewise, if the voltage across $R_{SENSE}$ is higher than $V_1$, then the operation amplifier will drive transistor 255 toward a lower conductance state, causing less current to flow from the battery and through $R_{SENSE}$ until the voltage across $R_{SENSE}$ decreases to become similar to $V_1$. When the voltage across $R_{SENSE}$ is similar to $V_1$, then the discharge current from the battery is approximately $V_1/R_{SENSE}$. Thus the discharge current for the battery can be controlled by varying the voltage $V_1$. If $V_1$ is held constant, then the battery discharge current will be held approximately constant, as required during phase 1 of the discharge. While the embodiment shown in FIG. 2C utilizes a bipolar-junction transistor, a field effect transistor or other signal-controlled structure capable of serving as a variable load element may be used in alternative embodiments.

The phase 2 circuitry 218 shown in FIG. 2C comprises an operational amplifier 265 configured to act as a buffer (or voltage follower). In this configuration, the output voltage of the operational amplifier is held approximately equal to the input, in this embodiment $V_2$. The function of the operational amplifier is to provide adjustable current sink capacity at an output voltage approximately equal to the input voltage. Thus, if the phase 2 circuitry 218 is coupled to the battery via switch 260, the battery voltage will be held at a voltage approximately constant similar to $V_2$ by the operational amplifier, as required for phase 2 of the discharge, and the discharge current from battery should adjust (normally decrease) to maintain that voltage. The discharge current flows from the battery into operational amplifier 265 and to ground via the operational amplifier's unshown negative supply rail. The voltage $V_2$ is generated by the voltage reference generator 216 based on control inputs from the battery management system via the control network 235. The voltage $V_2$ will nominally be set to be equal to $V_{TCC}$ (in which case the battery will discharge at the constant voltage $V_{TCC}$) but in no case will $V_2$ be set to be greater than $V_{TCC}$ during battery discharging (or the battery would begin to charge through the operational amplifier 265).

As can be appreciated from the foregoing, operational amplifiers 250 and 265 enable relatively precise and continuous control over the voltage and current during the discharge process, mitigating the dithering effect that may occur in the embodiment of FIG. 2B (e.g., as that circuit switches back and forth between two resistance values) and also avoiding voltage/current spikes that may occur during load switching. Note that the embodiment shown may be modified in numerous ways while generally maintaining the operational behavior described above. For example, a single operational amplifier may be switched between two different output/feedback arrangements corresponding to those shown in circuits 217 and 218.

Figure 3A:
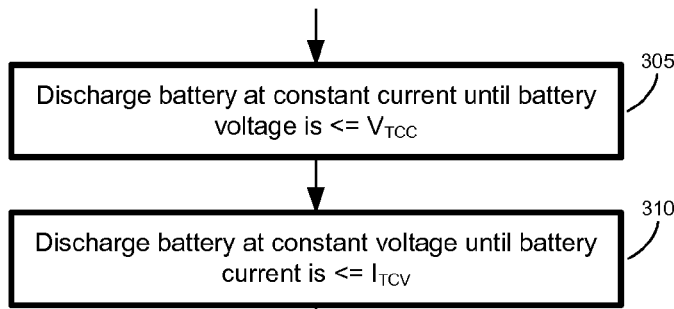
FIG. 3A shows an exemplary sequence of operations for fully discharging a battery.

FIG. 3A shows an exemplary sequence of operations for fully discharging a battery. This sequence shows the two phases of the discharge process. At 305, the battery is discharged at a constant current of $I_{TCC}$ (as controlled by the adjustable load 215) until the battery voltage is less than or equal to $V_{TCC}$. After the battery voltage has reduced down to $V_{TCC}$, the battery is then discharged at a constant voltage of approximately $V_{TCC}$ again controlled by the adjustable load 215) until the battery current is reduced to become equal to or less than $I_{TCV}$, at which point the battery is deemed to be "fully discharged".

In one embodiment $V_{TCC}$, $I_{TCC}$ and $I_{TCV}$ are predetermined and fixed. In other embodiments they may be dynamically calculated based on the current system operating conditions and/or based upon factors including, but not limited to battery age, discharge cycles, temperature and so forth.

Figure 3B:
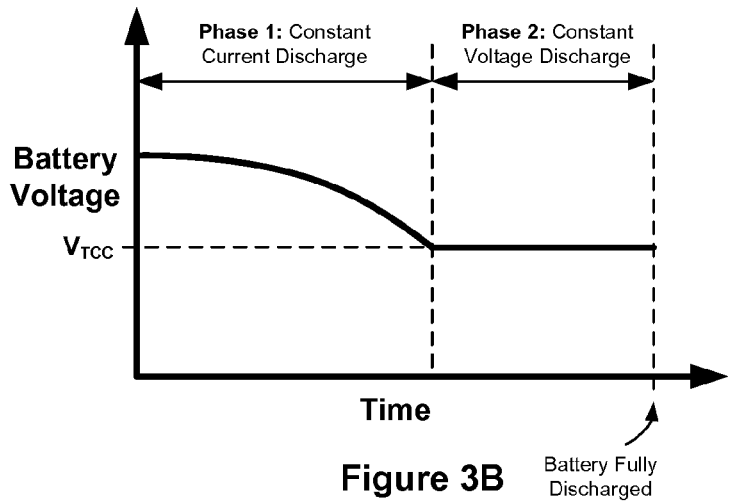
FIG. 3B is an exemplary diagram showing the relationship between battery voltage and time during a battery discharge process utilizing the techniques described herein.
Figure 3C:
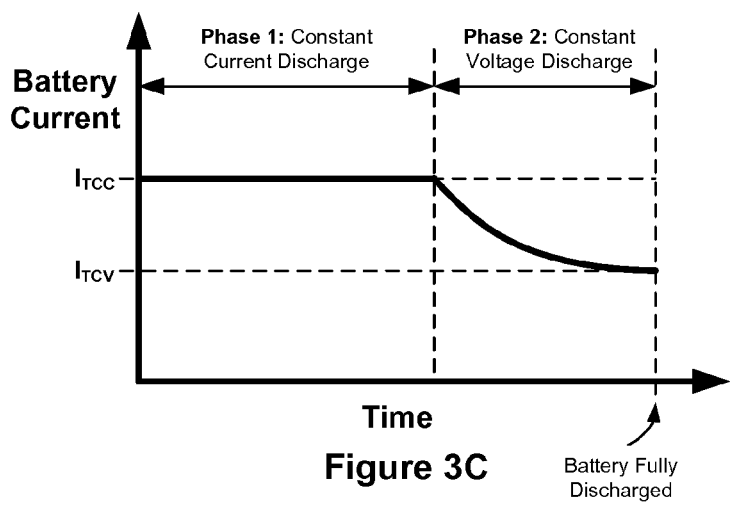
FIG. 3C is an exemplary diagram showing the relationship between battery current and time during a battery discharge process utilizing the techniques described herein.

The exemplary diagrams shown in FIG. 3B and FIG. 3C illustrate the relationship between battery voltage, battery current and time during the battery discharge process described herein. During phase 1, the discharge current is held constant approximately equal to $I_{TCC}$ and the battery voltage decreases until it becomes less than or equal to $V_{TCC}$, at which time phase 2 begins. During phase 2 the battery voltage is held constant approximately equal to $V_{TCC}$ until the decreasing battery discharge current becomes equal to or less than $I_{TCV}$, at which Point the battery is deemed to be "fully discharged".

Figure 4A:
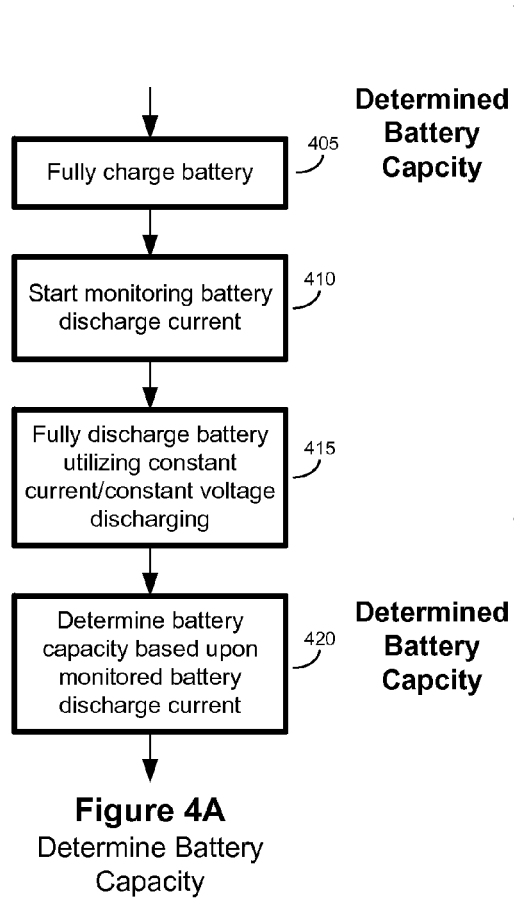
FIG. 4A shows an exemplary sequence of operations for determining the capacity of a battery.

FIG. 4A shows an exemplary sequence of operations for determining the capacity of a battery utilizing the techniques for discharging a battery described herein. Beginning at 405 the battery is fully charged. One embodiment may first charge the battery using a constant current until a predetermined voltage is reached and then second charge the battery using a constant voltage gradually decreasing the charging current until a predetermined current is reached. Other embodiments may use different techniques to fully charge the battery. Next, at 410, the battery management system begins monitoring (or accumulating a measurement or count of) the battery discharge current. In one implementation, for example, as the battery discharges, the number of coulombs delivered by the battery is counted and totaled until the battery is fully discharged under the two-phase constant-current/constant-voltage discharge technique described above (i.e., as shown at 415). At 420, the battery capacity is determined based on the monitored battery discharge current, for example by recording the net accumulated charge as the capacity of the battery, by indexing a table of battery capacities using the net accumulated charge (and possibly other parameters, such as average temperature during discharge), by comparing the net accumulated charge against one or more prior accumulated charge measurements to revise a previously recorded battery capacity measurement, etc.

Figure 4B:
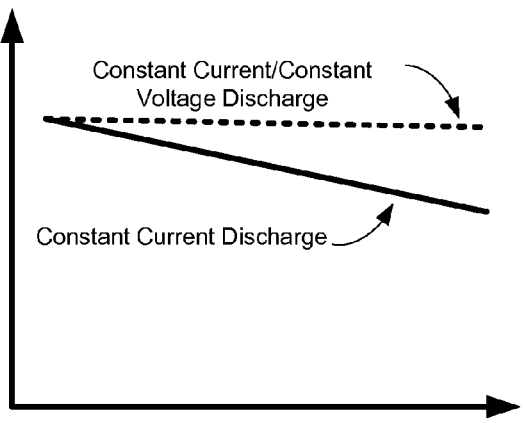
FIG. 4B is an exemplary diagram showing the improvement in the consistency of the determined battery capacity across different battery discharge currents when the battery discharge process utilizes the techniques describe herein.

FIG. 4B shows an exemplary diagram illustrating the improvement in the consistency of the determined battery capacity across different battery discharge currents when the battery discharge process utilizes the techniques describe herein. When the battery capacity is determined using only a constant current discharge technique (i.e. replacing the two-phase discharge approach shown in operation 415 of FIG. 4A with a single-phase constant current discharge process), the battery capacity determination is shown by the sloped solid line, yielding a varying capacity measurement (higher or lower) depending on the level of discharge current used to discharge the battery, and thus, a potentially inconsistent, less accurate determination of the actual battery capacity. If, however, the two-phase discharge approach described above and shown at 415 of FIG. 4A is utilized, a relatively consistent, more accurate battery capacity determination is achieved, despite variation in battery discharge current.

Figure 4C:
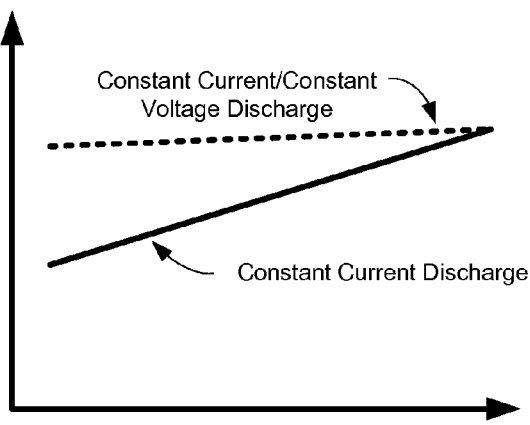
FIG. 4C is an exemplary diagram showing the improvement in the consistency of the determined battery capacity across different battery temperatures when the battery discharge process utilizes the techniques describe herein.

Similarly, FIG. 4C shows an exemplary diagram illustrating the improvement in the consistency of the determined battery capacity across different battery temperatures when the battery discharge process utilizes the techniques describe herein. When the battery capacity is determined using only a constant current discharge technique (i.e. replacing the two phase discharge process used in operation 415 of FIG. 4A with a single phase constant current discharge process), the battery capacity determination is shown by the solid line, increasing as the battery temperature increases. Thus, for the same battery, varying battery capacities may be determined that depend on the battery temperature during the battery capacity determination process. Again, this results in an inconsistent and less accurate determination of the actual battery capacity. If, however, the two-phase discharge approach described above and shown at 415 of FIG. 4A is utilized, the battery capacity determination is shown by the dashed upper line, where the determined battery is more consistent and therefore more accurate over different battery temperatures.

In the foregoing description and in the accompanying drawings, specific terminology and drawing symbols have been set forth to provide a thorough understanding of the present invention. In some instances, the terminology and symbols may imply specific details that are not required to practice the invention. For example, the term "coupled" is used herein to express a direct connection as well as a connection through one or more intervening circuits or structures. Device or system "programming" may include, for example and without limitation, loading a control value into a register, one-time programmable-circuit (e.g., blowing fuses within a configuration circuit during device production) or other storage circuit within an integrated circuit device of the host system (or host device) and thereby control an operational aspect of the host system or establish a host system configuration. The terms "exemplary" and "embodiment" are used to express an example, not a preference or requirement. Signal paths that appear as single conductors may include multiple conductors and vice-versa, and components shown as being included within or forming part of other components may instead be disposed separately from such other components. With regard to flow diagrams and the like, the order of operations may be different from those shown and, where practical, depicted operations may be omitted and/or further operations added.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of rendering a battery to a discharged state, the method comprising:
   drawing a constant discharge current from the battery until the battery voltage falls below a threshold voltage level; and
   after the battery voltage falls below the threshold voltage level, maintaining the battery voltage at a predetermined constant voltage until a time-varying discharge current being drawn from the battery falls to the threshold current level.

2. The method of claim 1 wherein drawing the constant discharge current from the battery until the battery voltage falls below the threshold voltage level comprises switchably coupling the battery to a time-varying load impedance and varying the time-varying load impedance as necessary to maintain the constant discharge current.

3. The method of claim 2 wherein varying the time-varying load impedance comprises switchably coupling two or more of a plurality of resistors between terminals of the battery at respective times.

4. The method of claim 2 wherein varying the time-varying load impedance comprises switchably coupling a transistor to the battery between terminals of the battery, the transistor having a control input coupled to an output of a feedback circuit.

5. The method of claim 1 wherein drawing a time-varying discharge current from the battery comprises switchably coupling the battery to a time-varying load impedance and varying the time-varying load impedance as necessary to maintain the constant discharge voltage.

6. The method of claim 5 wherein varying the time-varying load impedance comprises switchably coupling two or more of a plurality of resistors between terminals of the battery at respective times.

7. The method of claim 5 wherein varying the time-varying load impedance comprises switchably coupling an operational amplifier configured as a voltage follower to the battery.

8. The method of claim 1 further comprising accumulating a value corresponding to a total amount of current discharged from the battery while drawing the constant discharge current from the battery, and while drawing the time-varying discharge current from the battery.

9. The method of claim 8 further comprising determining the capacity of the battery based upon, at least in part, the value corresponding to the total amount of current discharged from the battery.

10. An apparatus for discharging a battery, the apparatus comprising:
    discharge circuitry operable to draw a constant discharge current from the battery or to draw a time-varying discharge current from the battery; and
    control circuitry to operate the discharge circuitry in a constant-current mode until the battery voltage falls below a threshold voltage level and, in a constant-voltage mode until the time-varying current falls below a threshold current level.

11. The apparatus of claim 10 wherein the discharge circuitry comprises time-varying load impedance circuitry capable of varying the time-varying load impedance as necessary to maintain the constant discharge current in the constant-current mode and capable of varying the time-varying load impedance as necessary to maintain the battery voltage at a predetermined constant voltage in the constant-voltage mode.

12. The apparatus of claim 11 wherein the time-varying load impedance circuitry comprises a plurality of resistive elements.

13. The apparatus of claim 11 wherein the time-varying load impedance comprises an operational amplifier having an output coupled to a control input of a transistor.

14. The apparatus of claim 11 wherein the time-varying load impedance comprises an operational amplifier configured as a voltage follower.

15. The apparatus of claim 10 further comprising circuitry to accumulate a value corresponding to a total amount of current discharged from the battery while the discharge circuitry operates in the constant-current mode and in the constant voltage mode.

16. The apparatus of claim 10 further comprising circuitry capable of determining the capacity of the battery based upon, at least in part, the value corresponding to the total amount of current discharged from the battery.

* * * * *